United States Patent [19]

Stretanski

[11] 3,975,358

[45] Aug. 17, 1976

[54] POLYMERS STABILIZED WITH AN ORGANO-NICKEL COMPOUND AND A DIALKYL PENTAERYTHRITOL DIPHOSPHITE

[75] Inventor: Joseph Anthony Stretanski, Clinton, N.J.

[73] Assignee: American Cyanamid Company, Stamford, Conn.

[22] Filed: Apr. 26, 1972

[21] Appl. No.: 247,640

[52] U.S. Cl. ................ 260/45.75 N; 260/45.8 A
[51] Int. Cl.$^2$ .......................................... C08J 3/20
[58] Field of Search ................ 260/45.75 N, 45.8 A

[56] References Cited
UNITED STATES PATENTS

| | | | |
|---|---|---|---|
| 2,971,940 | 2/1961 | Fuchsman et al. | 260/45.75 |
| 3,039,993 | 6/1962 | Friedman | 260/45.8 |
| 3,215,717 | 11/1965 | Foster | 260/45.75 |
| 3,303,162 | 2/1967 | Fuchsman | 260/45.75 |
| 3,636,022 | 1/1972 | Bright | 260/45.75 |
| 3,636,023 | 1/1972 | Murray | 260/45.75 |
| 3,749,694 | 7/1973 | Cantatore et al. | 260/45.75 |

OTHER PUBLICATIONS

Textile Research Journal – Mar. 1969, pp. 243 to 247 by Bonkowski.

*Primary Examiner*—V.P. Hoke
*Attorney, Agent, or Firm*—Philip Mintz

[57] ABSTRACT

Nickel amine, nickel alkanolamine, nickel aquo, and nickel bis- complexes of 2,2'-thiobis(p-alkylphenol), used to stabilize materials against degradation by ultraviolet radiation, are stabilized against thermal degradation by use of a dialkyl pentaerythritol diphosphite.

10 Claims, No Drawings

POLYMERS STABILIZED WITH AN ORGANO-NICKEL COMPOUND AND A DIALKYL PENTAERYTHRITOL DIPHOSPHITE

This invention relates to stabilizing nickel amine, nickel alkanolamine, nickel aquo, and nickel bis- complexes of 2,2'-thiobis(p-alkylphenols) against thermal degradation. More particularly, it relates to doing so by use of certain cyclic phosphites.

Nickel amine, nickel alkanolamine, nickel aquo, and nickel bis- complexes of 2,2'-thiobis(p-alkylphenols) are well known and widely used to stabilize polymers against degradation by ultraviolet radiation. The nickel amine and nickel alkanolamine complexes, which are characterized by a single nitrogen-to-nickel coordinate bond and a single nickel-to-sulfur coordinate bond for each nickel atom in the complex molecule, may be represented by the formula:

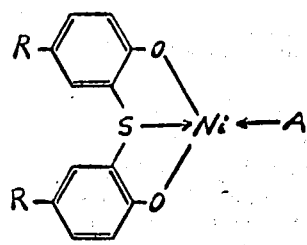

wherein each R is an alkyl group of 1 to 18 carbon atoms and A is a member selected from the group consisting of primary aliphatic amines, primary aromatic amines, cyclic secondary amines, and alkanolamines. Foster U.S. Pat. Nos. 3,215,717 and 3,313,770 discloses many of these complexes wherein A is an amine and Murray et al. U.S. Pat. No. 3,636,023 discloses many of these complexes wherein A is an alkanolamine. As disclosed in Stretanski et al. U.S. Pat. No. 3,816,492, a preferred nickel amine complex is the one wherein the primary aliphatic amine is cyclohexylamine. The nickel aquo complexes may also be represented by the same formula wherein A is water. These nickel aquo complexes are also disclosed in said Foster patents. The nickel bis- complexes, which are characterized by two nickel-to-sulfur coordinate bonds for each nickel atom in the complex molecule, may be represented by the formula:

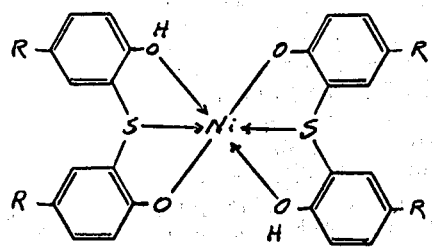

wherein each R is an alkyl group of 1 to 18 carbon atoms. These nickel bis- complexes are disclosed in Fuchsman et al. U.S. Pat. Nos. 2,971,940 and 2,971,941.

As disclosed in the aforesaid references, these complexes are all very effective for stabilizing polymers against degradation on exposure to ultraviolet radiation and they serve to provide dye-sites for nickel-chelatable dyes. Illustrative of the polymers wherein these complexes may be used are polyolefins such as polyethylene and polypropylene, acrylonitrile-butadiene-styrene polymers, polystyrene, polycarbonates, polyamides such as nylon, and the like. In such uses, typically the complex is blended with the polymer in the desired proportion, conventionally from about 0.01% to about 5%, preferably from about 0.2% to about 2%, based on weight of polymer, and the blend is then molded to form a finished article, as by injection molding, extruding, blow-molding, and fiber spinning. Since these molding processes normally involve the use of elevated temperatures, the complex used is subjected to conditions causing thermal degradation of the complex. Although the nickel alkanolamine complexes and the nickel cyclohexylamine complexes are much more resistant to thermal degradation than the other nickel amine or nickel aquo complexes, as disclosed in the aforesaid references, all these complexes tend to degrade on exposure to heat leading to discoloration of the polymer containing them and shade changes when such polymers are dyed.

In accordance with the present invention, it has now been found that the resistance to thermal degradation of all these nickel amine, nickel alkanolamine, nickel aquo, and nickel bis- complexes can be remarkably improved by the presence in the polymer containing such complexes of a cyclic phosphite of the formula:

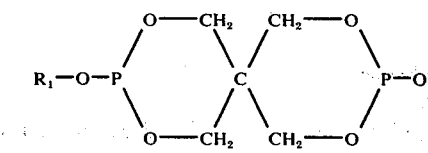

wherein $R_1$ and $R_2$ are each alkyl groups of 6 to 20 carbon atoms. These cyclic phosphites and a process for preparing them are disclosed in Hechenbleikner U.S. Pat. No. 3,205,250, particularly column 7, lines 25–43 and Examples 9–13 therein. Illustrative of such cyclic phosphites are diisodecyl pentaerythritol phosphite, distearyl pentaerythritol phosphite, dilauryl pentaerythritol phosphite described in said reference. Such cyclic phosphite will usually be used in a concentration of about 0.02% to about 1%, preferably from about 0.05% to about 0.5% by weight based on weight of polymer. The exact concentration chosen will, of course, be a function of several variables, such as the highest temperature to which the polymer containing the nickel amine, nickel alkanolamine, nickel aquo, or nickel bis- complex will be exposed, the amount of time of such exposure, the amount of discoloration which can be tolerated for those uses where the absolute minimum of discoloration is not absolutely necessary, etc.

These cyclic phosphites may be incorporated into the polymer in any manner, either before, with, or after the nickel complex is incorporated therein. A preferred manner is to preblend the nickel complex with the cyclic phosphite and then to mix these blended additives with the polymer. When this is done, the blend will contain these two additives in the desired proportion for use, which may be in the ratio of one part of the cyclic phosphite for every 4 to 20 parts of the nickel complex.

The nickel complex and the cyclic phosphite are advantageously used in the polymer substrates in combination with other additives or secondary stabilizers such as ultraviolet light absorbers, dyes, pigments, hindered phenol antioxidants, lubricants, secondary stabilizers such as dilauryl- and distearyl-thiodipropionates, etc. Illustrative of the ultraviolet light absorbers are those mentioned in column 3, lines 14–55 of Bright U.S. Pat. No. 3,636,022 and column 4, lines 1–17 of Murray et al. U.S. Pat. No. 3,636,023.

The effectiveness of the cyclic phosphites in protecting the nickel complexes in polymers in accordance with this invention can be evaluated in a number of ways. The heat stability of these new compositions can be determined by dry blending with a polymer followed by milling. A milled sheet can then be cut into strips which are inserted into a Melt Index Apparatus set at 290°C. An extrudate can be removed at regular intervals in order to obtain a color profile for each composition. The discoloration of the extrudates upon aging is given a numerical rating, each number above zero indicating a degree of discoloration:

0 - no change
1 - yellow-green
2 - tan-green
3 - slightly gray-tan
4 - brown-green
5 - gray-green
6 - brown
7 - gray
8 - dark brown
9 - black The invention is further illustrated by the following examples.

EXAMPLE I

50 Grams of unstabilized polypropylene powder was dry blended with 0.5 gram of the nickel n-butylamine complex of 2,2'-thiobis(p-t-octylphenol), 0.05 gram of the indicated phosphite, and 0.1 gram of 2,4,6-tri-t-butylphenol as a processing antioxidant. The blended mixture was milled on a standard plastic mill at 175°C. The milled samples were cut into strips and inserted into a Melt Index Apparatus at 290°C. and an extrudate removed every minute for 15 minutes in order to obtain a thermal discoloration profile for each composition, each extrudate being assigned a numerical color rating from 0–9 as described above. This data is reported in Table I.

Table I

Color Rating of Polypropylene Containing 1% Nickel n-Butylamine Complex of 2,2'-Thiobis (p-t-octylphenol) Plus 0.1% of Indicated Phosphite

| Sample Description* | Minutes Aging at 290°C. | | | | | |
|---|---|---|---|---|---|---|
| | 2 | 5 | 7 | 10 | 13 | 15 |
| 1% NBC alone | 1 | 4 | 6 | 8 | 9 | 9 |
| 1% NBC+0.1%A | 0 | 0 | 2 | 5 | 7 | 7 |
| 1% NBC+0.1%B | 0 | 3–4 | 6 | 8 | 9 | 9 |
| 1% NBC+0.1%C | 0 | 3 | 6 | 6 | 8 | 9 |
| 1% NBC+01.%D | 0 | 3–4 | 6 | 8 | 9 | 9 |

Table I -continued

Color Rating of Polypropylene Containing 1% Nickel n-Butylamine Complex of 2,2'-Thiobis (p-t-octylphenol) Plus 0.1% of Indicated Phosphite

| Sample Description* | Minutes Aging at 290°C. | | | | | |
|---|---|---|---|---|---|---|
| | 2 | 5 | 7 | 10 | 13 | 15 |
| 1% NBC+0.1%E | 0 | 2 | 5 | 7 | 9 | 9 |
| 1% NBC+0.1%F | 0 | 3–4 | 6 | 8 | 9 | 9 |
| 1% NBC+0.1%G | 0 | 0 | 2 | 5 | 7 | 7 |
| 1% NBC+0.1%H | 0 | 0 | 2 | 5 | 7 | 7 |
| 1% NBC+0.1%J | 0 | 3–4 | 6–7 | 9 | 9 | 9 |
| 1% NBC+0.1%K | 0 | 6 | 8 | 9 | 9 | 9 |
| 1% NBC+0.1%L | 0 | 0 | 1 | 2 | 5 | 5 |
| 1% NBC+0.1%M | 0 | 0 | 1 | 5 | 5 | 5 |

*NBC is nickel n-butylamine complex of 2,2'-thiobis(p-t-octyl-phenol)
A is phenyl didecyl phosphite
B is trilauryl phosphite
C is diphenyl isodecyl phosphite
D is triethylene glycol dineopentylene diphosphite
E is polypropylene glycol (mol. wt. 425) dineopentylene diphosphite
F is tetraphenyl(dipropylene glycol) diphosphite
G is dipropylene glycol pentol triphosphite
H is dipropylene glycol pentol triphosphonate
J is polyhydrogenated bisphenol A pentaerythritol diphosphite
K is diphenyl pentaerythritol diphosphite
L is diisodecyl pentaerythritol diphosphite
M is distearyl pentaerythritol diphosphite The data in Table I clearly indicate the superior resistance to thermal degradation in polypropylene of the nickel amine complex when stabilized with dialkyl pentaerythritol diphosphite (compounds L or M) in accordance with this invention when compared with numerous other phosphites.

EXAMPLE II

The procedure of Example I was followed except that 0.125 gram of a secondary stabilizer, distearyl thiodipropionate, was also incorporated in the 50 grams of polypropylene powder. The color ratings of the samples using various nickel amine and nickel alkanolamine complexes is reported in Table II.

Table II

Color Rating of Polypropylene Containing 1% Nickel Amine or Nickel Alkanolamine Complex Of 2,2'-Thiobis(p-t-octylphenol) Plus 0.1% of Phosphite

| Sample Description* | 2 | 5 | 7 | 10 | 13 | 15 | 18 | 20 |
|---|---|---|---|---|---|---|---|---|
| 1% NBC alone | 1 | 4 | 6 | 8 | 9 | 9 | — | — |
| 1% NBC+0.1%M | 0 | 0 | 5 | 7 | 7 | 7 | 7 | 7 |
| 1% NBC+0.1%N | 0 | 4 | 6 | 8 | 9 | 9 | — | — |
| 1% NHoC alone | 0 | 0 | 2 | 5 | 5 | 7 | — | — |
| 1% NHoC+0.1%M | 0 | 0 | 0 | 0 | 0 | 1 | 1 | 2 |
| 1% NHC alone | 0 | 0 | 2 | 5 | 7 | 7 | — | — |
| 1% NHC+0.1%M | 0 | 0 | 0 | 0 | 1 | 2 | 2 | 2 |

*NBC is nickel n-butylamine complex of 2,2'-thiobis(p-t-octyl-phenol)
NHoC is nickel cyclohexyldiethanolamine complex of 2,2'-thio-bis(p-t-octylphenol)
NHC is nickel cyclohexylamine complex of 2,2'-thiobis(p-t-octylphenol)
M is distearyl pentaerythritol diphosphite
N is tristearyl phosphite The data in Table II illustrate the superior resistance to thermal degradation in polypropylene of several nickel complexes of 2,2'-thiobis(p-t-octylphenol) when stabilized with dialkyl pentaerythritol diphosphite in accordance with this invention. Further, when used with the nickel alkanolamine or nickel cyclohexylamine complex of 2,2'-thiobis(p-t-octylphenol), compounds which are inherently more thermally stable than other nickel amine or nickel aquo complexes of 2,2'-thiobis(p-t-octylphenol), the dialkyl pentaerythritol diphosphite almost completely eliminates discoloration due to thermal degradation of the complex.

I claim:

1. A polymer subject to degradation on exposure to ultraviolet radiation stabilized against degradation on exposure to ultraviolet radiation by an effective amount of a nickel amine, nickel aquo, or nickel bis-complex of 2,2'-thiobis(p-alkylphenol) wherein each alkyl group has up to 18 carbon atoms and further stabilized against thermal degradation of said complex on exposure to heat by an effective amount of a dialkyl pentaerythritol diphosphite wherein each alkyl group has 6 to 20 carbon atoms said polymer being selected from the group consisting of polyolefins, acrylonitrile-butadiene-styrene polymers, polystyrene, polycarbonates, and polyamides.

2. A polymer composition as defined in claim 1 wherein said complex has the formula:

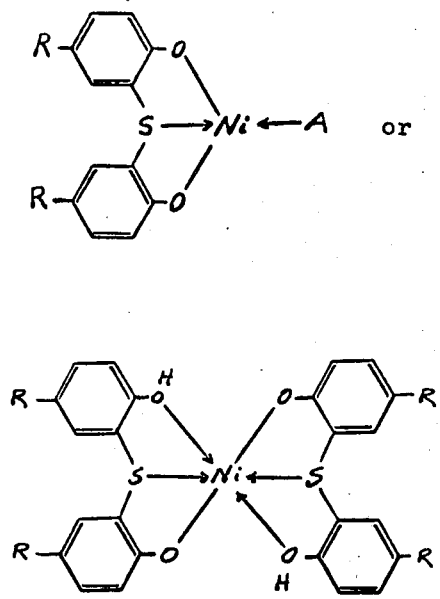

or

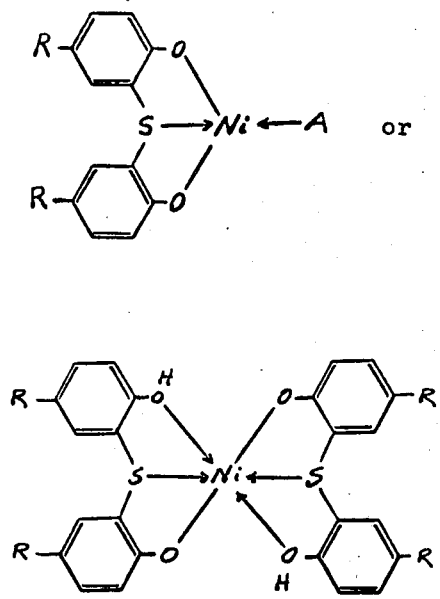

wherein each R is an alkyl group of 1 to 18 carbon atoms and A is a member selected from the group consisting of primary aliphatic amines, primary aromatic amines, cyclic secondary amines, water and alkanolamines and wherein said diphosphite has the formula:

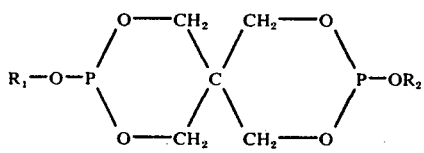

wherein $R_1$ and $R_2$ are each alkyl groups of 6 to 20 carbon atoms.

3. A polymer composition as defined in claim 1 wherein said complex is present in a concentration between about 0.01% and about 5% on weight of polymer and said diphosphite is present in a concentration between about 0.02% and about 1% on weight of polymer.

4. A polymer composition as defined in claim 1 wherein said polymer is a polyolefin.

5. A polymer composition as defined in claim 2 wherein said complex is (a) the nickel n-butylamine complex, (b) the nickel cyclohexyldiethanolamine, or (c) the nickel cyclohexylamine complex of 2,2'-thiobis(p-t-octylphenol) and said diphosphite is diisodecyl or distearyl pentaerythritol diphosphite.

6. A stabilizer composition comprising, in combination, a nickel amine, nickel aquo, or nickel bis- complex of 2,2'-thiobis(p-alkylphenol) wherein each alkyl group has up to 18 carbon atoms and a dialkyl pentaerythritol diphosphite wherein each alkyl group has 6 to 20 carbon atoms.

7. A stabilizer composition as defined in claim 6 wherein said complex has the formula:

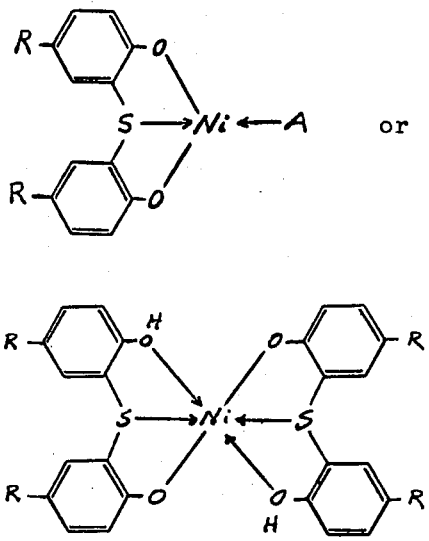

wherein each R is an alkyl group of 1 to 18 carbon atoms and A is a member selected from the group consisting of primary aliphatic amines, primary aromatic amines, cyclic secondary amines, water and alkanolamines and wherein said diphosphite has the formula:

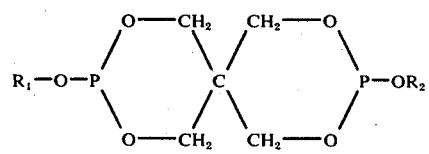

wherein $R_1$ and $R_2$ are each alkyl groups of 6 to 20 carbon atoms.

8. A stabilizer composition as defined in claim 6 containing one part of said diphosphite for every 4 to 20 parts of said complex.

9. A polymer composition as defined in claim 1 wherein said complex is characterized by either a single nitrogen-to-nickel coordinate bond and a single nickel-to-sulfur coordinate bond for each nickel atom in the complex molecule or two nickel-to-sulfur coordinate bonds for each nickel atom in the complex molecule.

10. A polymer composition as defined in claim 6 wherein said complex is characterized by either a single nitrogen-to-nickel coordinate bond and a single nickel-to-sulfur coordinate bond for each nickel atom in the complex molecule or two nickel-to-sulfur coordinate bonds for each nickel atom in the complex molecule.

* * * * *